(12) United States Patent
D'Ascanio et al.

(10) Patent No.: US 8,618,691 B2
(45) Date of Patent: Dec. 31, 2013

(54) LANDSCAPE ELECTRICAL COMPONENT CONNECTOR SYSTEM

(75) Inventors: Franco Christopher D'Ascanio, Key Colony Beach, FL (US); Franco Luigi D'Ascanio, Key Colony Beach, FL (US)

(73) Assignee: Coastal Source, LLC, Marathon, FL (US)

( * ) Notice: Subject to any disclaimer, the term of this patent is extended or adjusted under 35 U.S.C. 154(b) by 345 days.

(21) Appl. No.: 12/932,302

(22) Filed: Feb. 23, 2011

(65) Prior Publication Data

US 2012/0212048 A1 Aug. 23, 2012

(51) Int. Cl.
*H02J 1/00* (2006.01)
(52) U.S. Cl.
USPC .............................................. 307/11; 307/147
(58) Field of Classification Search
USPC ................................ 307/147, 11; 174/53, 59
See application file for complete search history.

(56) References Cited

U.S. PATENT DOCUMENTS

| 2007/0123115 | A1* | 5/2007 | Janos et al. | 439/798 |
| 2008/0151545 | A1* | 6/2008 | Kratz | 362/249 |
| 2009/0056775 | A1* | 3/2009 | Kuelbs | 135/16 |
| 2011/0062888 | A1* | 3/2011 | Bondy et al. | 315/294 |

* cited by examiner

*Primary Examiner* — Daniel Cavallari
(74) *Attorney, Agent, or Firm* — Stuart M. Goldstein

(57) ABSTRACT

A landscape electrical component connector system is provided which is based on a low-voltage electrical circuit with underground wire cable lines and interchangeable, below ground waterproof connectors which interconnect outdoor electrically positioned above ground lighting, audio, and cooling components. These components, which are hard-wired with waterproof connectors, provide versatility in their ability to be easily and simply added and removed from the system manually, without the use of tools, as desired by the owner. The waterproof connectors are quick connect elements which allow for fast and clean interchange of the various components and circuit splitters and extensions, both during initial installation of the system and after it has been installed.

8 Claims, 6 Drawing Sheets

LANDSCAPE ELECTRICAL COMPONENT CONNECTOR SYSTEM

FIELD OF THE INVENTION

This invention relates generally to the field of outdoor landscape lighting, audio, and cooling and seeks to advance this field by increasing the durability, application and flexibility of the components utilized in the system.

BACKGROUND OF THE INVENTION

In the outdoor lighting industry, there are currently many offerings for conventional lighting and fixture installation through tedious underground electrical connections. Over time, such connections are plagued with electrolysis and corrosion problems and ultimately failure. Replacement of such inaccessible underground components is laborious and expensive.

In addition, these systems lack the versatility of permitting the interchanging of components. Once current systems are installed, the removal and addition of components is difficult and generally impractical, especially, once again, in view of the costs involved.

Moreover, existing technology requires different trades people working independently to install separate and incompatible systems. This calls for individuals having varied expertise and results in duplication of work in the installation of the separate components of the systems and the manner each such trades person performs his services.

SUMMARY OF THE INVENTION

The landscape electrical component connector system of the present invention seeks to simplify and ease the installation of system components for homeowners, caretakers, and electricians alike. It is a "plug and play" system which provides product longevity and system versatility that far exceeds any system currently available.

The current plug and play system is based on a low-voltage electrical circuit with underground wire cable lines and interchangeable, below ground waterproof connectors which interconnect outdoor electrically positioned above ground lighting, audio, and cooling components. These components, which are hard-wired with waterproof connectors, provide versatility in their ability to be easily and simply added and removed from the system manually, without the use of tools, as desired by the owner. The waterproof connectors are quick connect elements which allow for fast and clean interchange of the various components and circuit splitters and extensions, both during initial installation of the system and after it has been installed.

In addition, the present invention is expandable to feature signal over power technology, audio and control signals ride on and are superimposed on the same electrical line or cable that is powering each component. This allows for complex signals and control commands to be communicated within a single cable. In similar fashion, a multi-conductor cable can be integrated into the system, allowing discrete power, signal, and control commands to be transmitted to a single component or multiple components.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
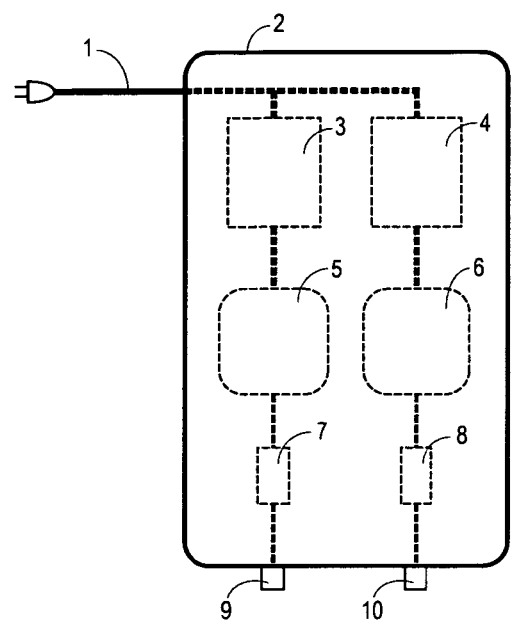
FIG. 1 shows the interior components and connection order of a 300-watt outdoor transformer module of the present invention.
Figure 2:
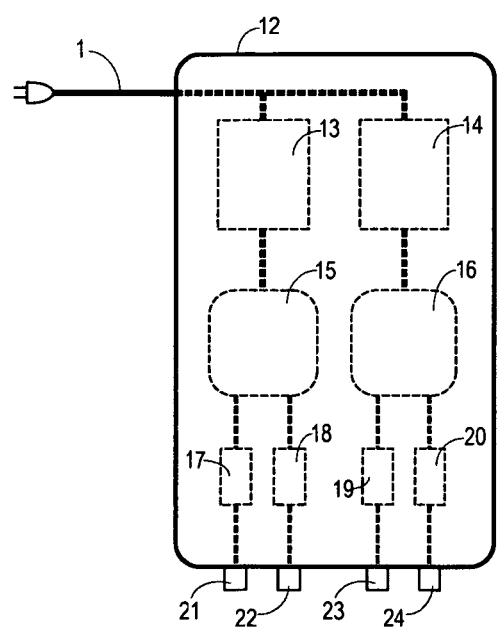
FIG. 2 shows the interior components and connection order of a 600-watt outdoor transformer module of the present invention.

The landscape electrical component connector system of the present invention comprises utility power line input 1 extending into outdoor stainless steel electronics enclosure, outdoor transformer module 2. As seen in FIG. 1, the utility power is fed into two automated power switches 3 and 4, which in turn feed and control a pair of 150 watt transformers 5 and 6. Two low voltage leads from each transformer are controlled via circuit breaker switches 7 and 8 terminating at waterproof chassis-mounted terminals 9 and 10 at the bottom of transformer module 2. FIG. 2 shows alternate outdoor transformer module 12 with utility power input line 1 fed into two automated switches 13 and 14 which, in turn, feed and control a pair of 300 watt power transformers 15 and 16. In this case, four low voltage leads from each transformer are controlled with circuit breaker switches 17, 18, 19 and 20, before terminating at waterproof chassis-mounted terminals 21, 22, 23, and 24, at the bottom of transformer module 12.

Figure 3:
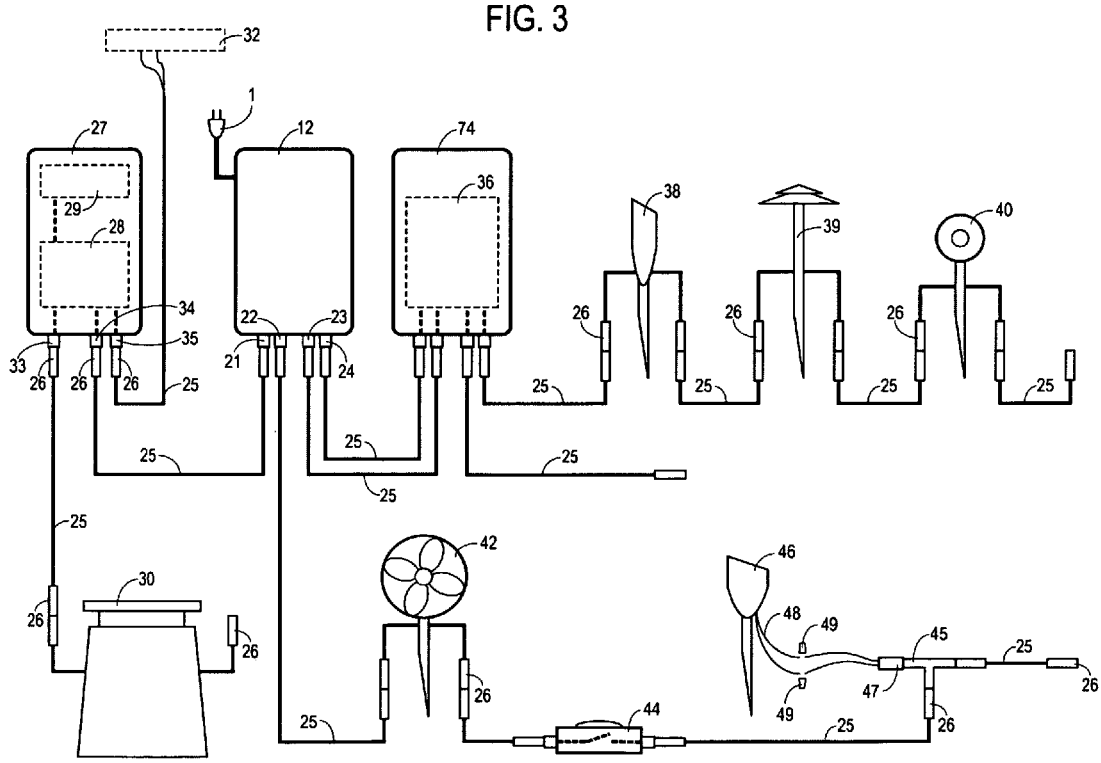
FIG. 3 is a schematic representation of one of many configurations in which the system of the present invention can be installed.

FIG. 3 is a schematic example of how the plug and play system of the present invention can be configured. Two conductor, tinned wire cable lines 25 extend from transformer module 12, via chassis-mounted terminals 21, 22, 23, and 24. Lines or electrical line means 25 are buried between three to six inches below ground. The ends of lines 25 are connected to below ground, waterproof connectors or connection means 26. Lines 25 are used as power circuits to the outdoor components of the system or are used as jumpers to other system modulars. Many accessory system modules are possible, but as examples herein, outdoor audio module 27 and outdoor battery module 74 are shown in FIG. 3.

Accessory modules are housed within stainless steel electrical enclosures, similar to that of transformer module 12.

Outdoor audio module 27 has a built-in outdoor rated amplifier 28 with internal audio source component 29. Waterproof chassis-mount terminals, e.g. 33, 34, and 35 on the bottom of outdoor audio module 27, are provided for plug and play connections, via connectors 26 and lines 25, to outdoor speakers 30, to transformer module 12 and potentially to external audio source 32.

Outdoor battery module 74 houses an in-line battery with automated switching 36. This module offers a battery back-up solution for security lighting and other critical power elements in case of a power outage.

Specialized plug and play components can be easily changed and interchanged in the system using waterproof connectors 26. Such components include landscape bullet lights 38, path lights 39 and effect laser lights 40. Since the power outputs from transformer module 12 are controlled through automated power switches 3 and 4, select power strings can be switchable remotely (or manually, locally at each component) for components such as outdoor fans 42. In-line switching is also possible with foot or pole activated outdoor switches 44.

Any line 25 can be split with specialized waterproof T or Y splitters 45 which use plug and play connectors 26. Connecting conventional (new or existing) outdoor elements 46 into the system is simple with the use of specialized plug and play adaptors 47, which adapt from the waterproof connector standard of the rest of the system to pigtail wires 48 by using waterproof, silicone-filled wire connecting members 49.

Figure 4:
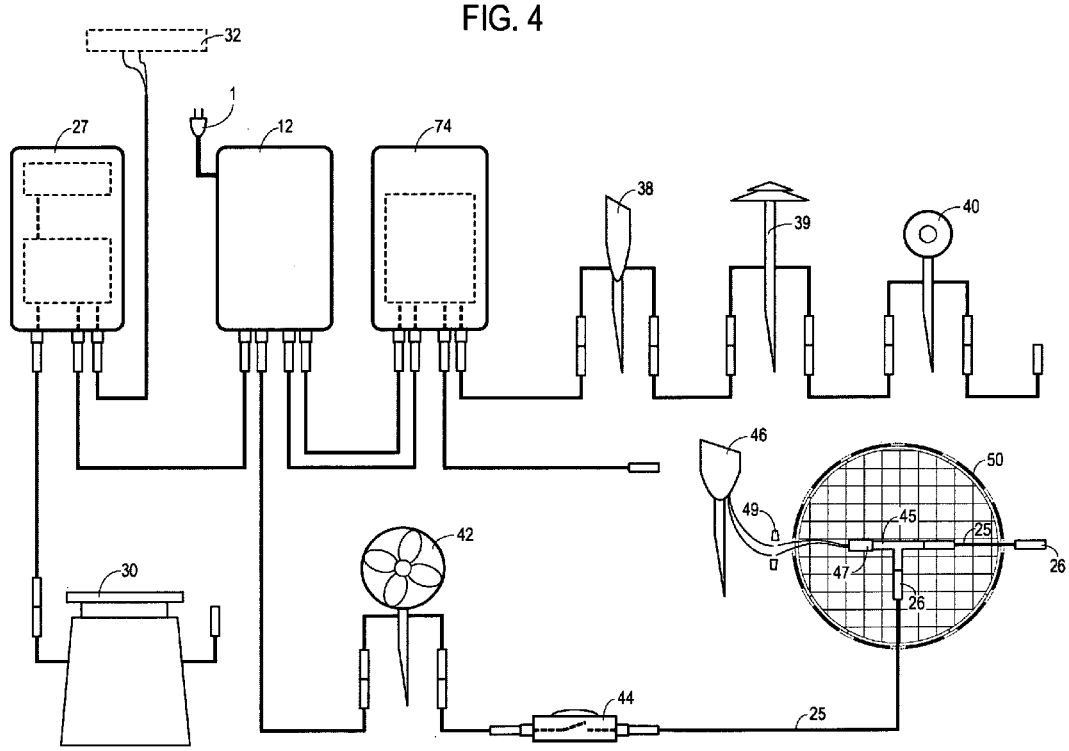
FIG. 4 is a schematic representation of the system in FIG. 3, showing the use of the connection hub of the present invention.
Figure 6:
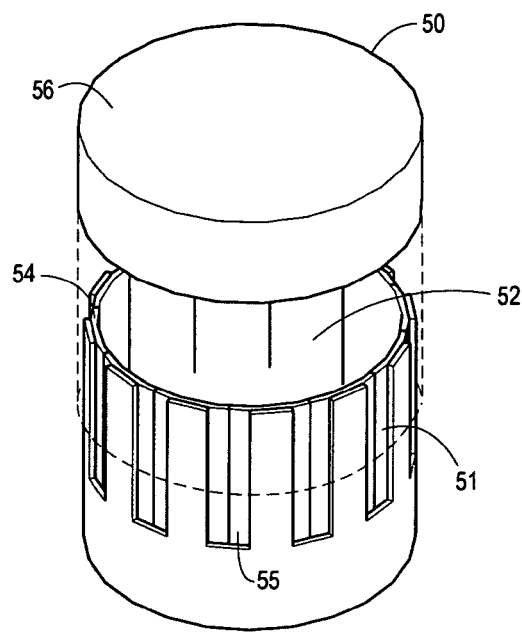
FIG. 6 is a perspective view of the connection hub of the present invention.
Figure 7:
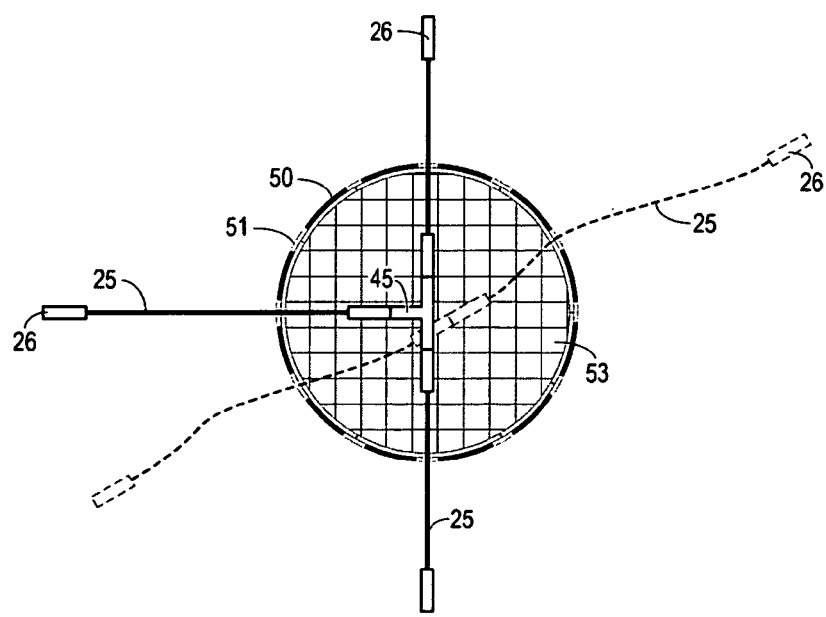
FIG. 7 is top view of the connection hub of the present invention showing its use with electrical lines, a splitter and connectors.

FIG. 4 shows a schematic example of the system utilizing the plug and play connection hub 50, shown more particularly in FIGS. 6 and 7. Connection hub 50 is configured to be partially buried within an accommodating location of the system. It is an enclosure which provides for easy access to below grade plug and play splitters 45 and connectors 26. Hub 50 itself comprises a cylindrical basket-like enclosure with vertically extending cut-out openings 51 extending into enclosed interior space 52. Hub 50 further comprises mesh bottom 53 to allow moisture to pass to the soil below the hub. Cut-out openings 51 enable lines 25 to enter hub 50 and then into space 52 through aligned slits 55 located in concentric rubber gasket 54. Removeable lid 56 allows access into space 52 of hub 50.

Figure 5:
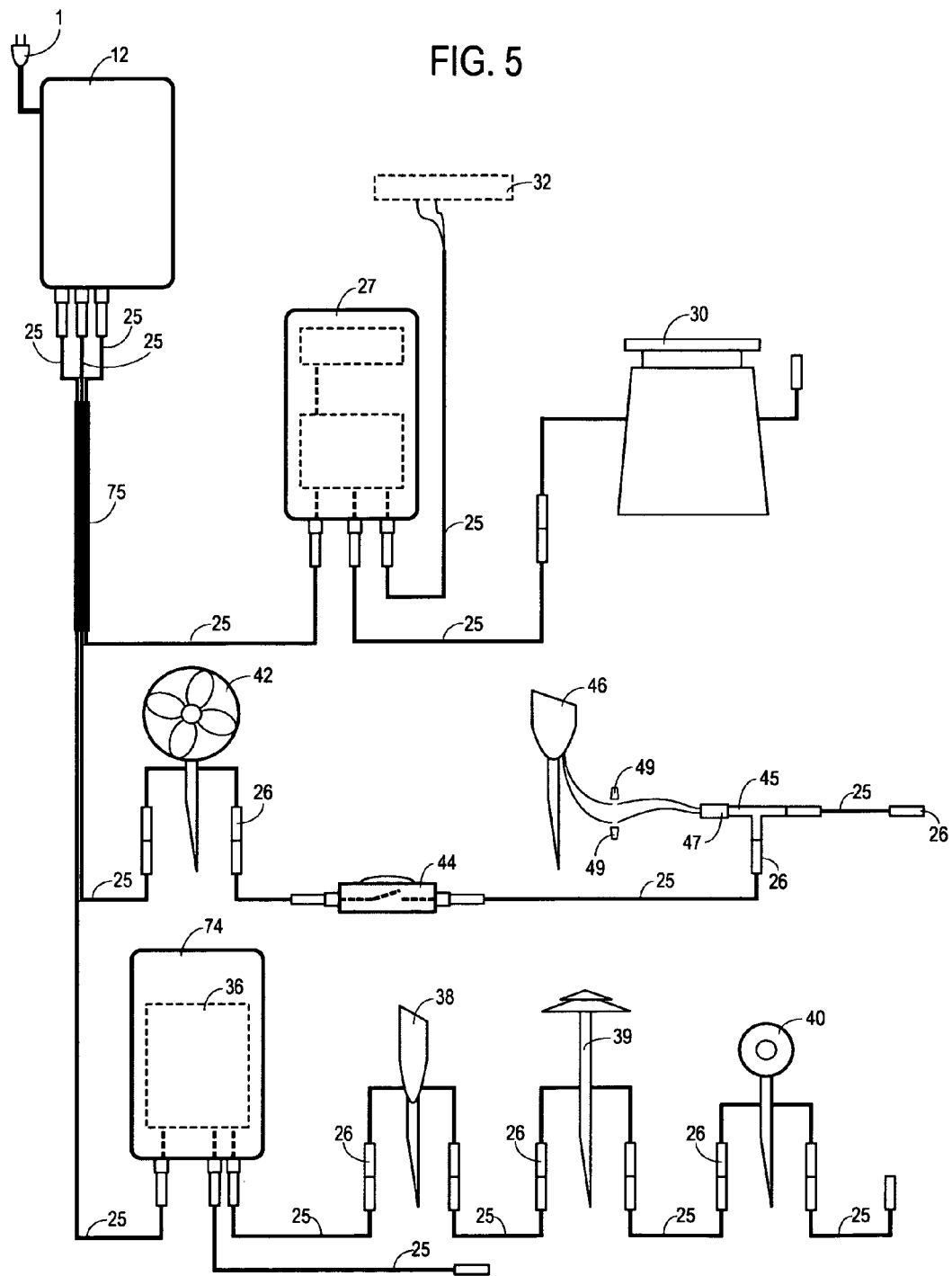
FIG. 5 is a schematic representation of the system in FIG. 3, showing the use of the six conductor cable of the present invention.

FIG. 5 shows a schematic example of the system of the present invention utilizing six conductor cable 75, for providing electrical feed from transformer module 12 to the other components of the system.

Figure 10:
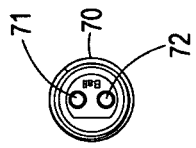
FIG. 10 is an end view of the female connector shown in FIG. 8.
Figure 8:
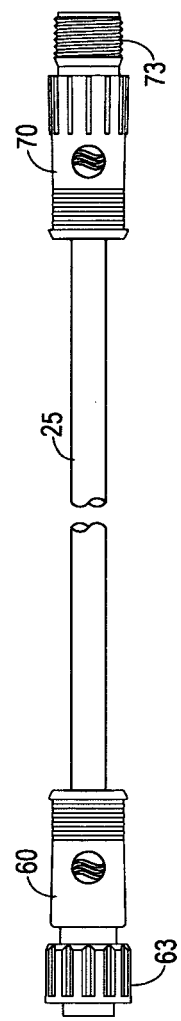
FIG. 8 is an elevation view showing the waterproof connectors of the present invention extending from a wire cable line.
Figure 9:
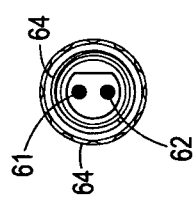
FIG. 9 is an end view of the male connector shown in FIG. 8.

FIG. 8 is an elevation view of the two types of waterproof plug-in connectors 26 secured at the end of a representative line 25. FIG. 9 is an end view of the male element of connector 60 and FIG. 10 is an end view of the female end of connector 70. Prong members 61 and 62 of male connector 60 are configured to be inserted into receptacle openings 71 and 72 of female connector 70. Once prongs 61 and 62 are snugly inserted into receptacles 71 and 72, internally threaded connector nut 63 of male connector 60 is screwed onto external threaded fitting 73 of female connector 70. A watertight seal is created by this tightened connection and by waterproof sealing gasket 64 which surrounds the internal surfaces of the connection when connectors 60 and 70 are secured together. It is contemplated that the attachment and detachment of connectors 60 and 70 are done manually, without the use of tools. The connectors should be hand tightened sufficiently to provide a snug and tight connection, but not so tight as to preclude manual disconnection, if so desired, without the need for tools. Hand tightening also avoids potential damage to the connections.

It is thus seen that the landscape electrical component connector system of the present invention provides an efficient and versatile means of positioning various lighting, audio, and cooling components in an infinite array of configurations. The system also permits ready, manual substitution or additions of components, easily and quickly, without the use of tools. The below ground running of lines 25 and the use of above ground watertight connectors 26 insures for the permanency of the system and its longevity of use. Connection hub 50 provides additional versatility to the system by providing easy access to below ground plug and play splits and connections.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A landscape electrical component connector system for the interconnection of outdoor lighting, audio, and cooling operable components, said system comprising:
    at least one transformer module means for receiving electrical power and providing the requisite electricity to more than one operable component;
    electrical line means extending underground between the transformer module means and the operable components for delivering electricity from the transformer module means to the operable components;
    connection means attached to the electrical line means for attaching and detaching the electrical line means to the transformer module means and to the operable components, said connection means comprising male and female plug-in connectors; and
    hub means located underground for receiving and housing the electrical line means and male and female plug-in connectors attached to the electrical line means, the hub means providing access for the attachment and detachment of connectors and thus the addition or removal of operable components from the system, wherein the hub means comprises an enclosure having a plurality of circumferential cut-out openings and an interior space for housing the line means and connectors, said hub means also comprising a removeable lid.

2. The system as in claim 1 wherein the hub means further comprises an integral gasket member with slits aligned with the cut-out openings, the cut-out openings and slits being configured to receive the electrical line means for inclusion into the interior space, allowing for attachment and detachment with the connectors housed within the interior space.

3. The system as in claim 1 wherein the operable components comprise electrical lighting fixtures.

4. The system as in claim 1 wherein the operable components comprise audio components.

5. The system as in claim 1 wherein the operable components comprise cooling fans.

6. The system as in claim 1 comprising at least one accessory system module.

7. The system as in claim 6 wherein the accessory system module comprises an outdoor back-up battery module, interconnected to the system by the connection means.

8. The system as in claim 6 wherein the accessory system module comprises an outdoor audio module, interconnected to the system by the connection means.

* * * * *